United States Patent
Sugita

(10) Patent No.: US 8,422,482 B2
(45) Date of Patent: Apr. 16, 2013

(54) SPACE-DIVERSITY WIRELESS IMAGE COMMUNICATION SYSTEM

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1405 days.

(21) Appl. No.: 11/126,154

(22) Filed: May 11, 2005

(65) Prior Publication Data

US 2005/0259630 A1 Nov. 24, 2005

(30) Foreign Application Priority Data

May 19, 2004 (JP) .................................. 2004-149635

(51) Int. Cl.
H04J 0/06 (2006.01)
(52) U.S. Cl.
USPC ........... 370/350; 370/203; 370/339; 370/335; 370/333; 370/324; 455/557; 455/412.1; 455/500; 707/770; 709/203; 709/220
(58) Field of Classification Search .................. 370/350, 370/503–515; 455/562.1, 132–135, 103, 455/272, 277.1, 277.2; 428/212
See application file for complete search history.

(56) References Cited

U.S. PATENT DOCUMENTS

| | | | | |
|---|---|---|---|---|
| 5,203,027 A | * | 4/1993 | Nounin et al. | 455/134 |
| 5,239,541 A | * | 8/1993 | Murai | 370/345 |
| 5,325,403 A | * | 6/1994 | Siwiak et al. | 375/347 |
| 5,541,963 A | * | 7/1996 | Nakagoshi | 455/277.1 |
| 6,100,853 A | * | 8/2000 | Schaffner et al. | 343/771 |
| 6,483,884 B1 | * | 11/2002 | Shen et al. | 455/135 |
| 6,546,026 B1 | * | 4/2003 | Goeddel | 370/513 |
| 2003/0103556 A1 | * | 6/2003 | Han | 375/148 |
| 2003/0175488 A1 | * | 9/2003 | Asthana et al. | 428/212 |

FOREIGN PATENT DOCUMENTS

| | | |
|---|---|---|
| DE | 40 06 295 A1 | 8/1990 |
| EP | 1 489 758 A1 | 12/2004 |
| JP | 9-284188 | 10/1997 |
| JP | 10-051427 | 2/1998 |
| JP | 2000-59277 | 2/2000 |
| WO | WO 03/081806 A1 | 10/2003 |

* cited by examiner

*Primary Examiner* — Patrick Edouard
*Assistant Examiner* — Fred Casca
(74) *Attorney, Agent, or Firm* — Oblon, Spivak, McClelland, Maier & Neustadt, L.L.P.

(57) ABSTRACT

A wireless communication system has transmission apparatus transmitting a wireless signal based on a transmission unit and reception apparatus. The reception apparatus includes plural reception devices receiving the wireless signal to obtain the informational signals and output-controlling device selecting any informational signal from the informational signals. The reception device has communication-quality-detecting device that detects communication quality of the wireless signal, a memory storing the informational signal, and synchronization-detection-storage-controlling device that detects the synchronization signal and controls the memory to store the informational signal based on a detected result of the synchronization signal. The output-controlling device reads the informational signals out of the memories with the signals being synchronized after the reception devices have detected the synchronization signals, selects the reception device having satisfactory communication quality based on a detected result of the communication quality, and outputs the informational signal read out of the selected reception device.

22 Claims, 9 Drawing Sheets

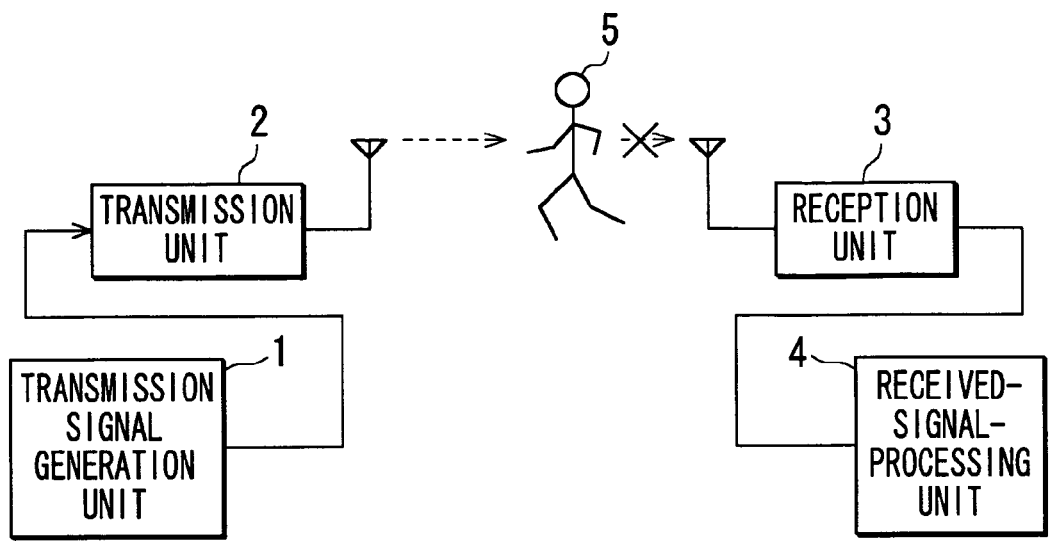
F I G. 1
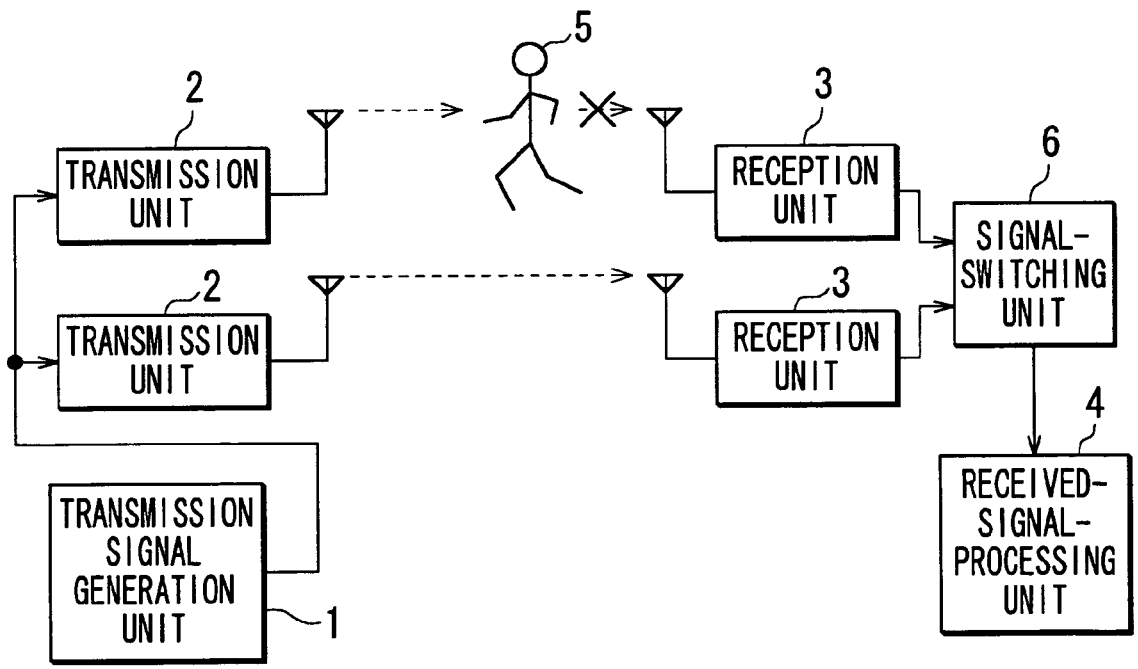
F I G. 2

SPACE-DIVERSITY WIRELESS IMAGE COMMUNICATION SYSTEM

CROSSREFERENCE TO RELATED APPLICATION

The present invention contains subject matter related to Japanese Patent Application JP 2004-149635 filed in the Japanese Patent Office on May 19, 2004, the entire contents of which being incorporated herein by reference.

BACKGROUND OF THE INVENTION

1. Field of the Invention

The present invention relates to a wireless communication system. More particularly, it relates to a wireless communication system for an image display system in which a wireless signal is transmitted and plural receivers can receive the wireless signal.

2. Description of Related Art

An image display system has recently realized increase in the flexibility in a system configuration by separating an image display mechanism. For example, various kinds of image display apparatuses each constituted of a display element such as a plasma display panel and a liquid crystal panel and image signal output apparatus having a tuner function, a recording medium reproduction function, and the like are separately provided in the image display system. In such the image display system, user's desired image display apparatus and the image signal output apparatus are connected with each other so that the increase in the flexibility in a system configuration can be realized.

However, when the image display apparatus and the image signal output apparatus are separately provided, it may be required to connect those apparatuses to each other using a cable, thereby limiting flexibility of a layout for the apparatuses. Exposure of the cable is not much to look at. In order to resolve such an issue, a super high-definition image or a high-definition motion image is transmitted between the image display apparatus and the image signal output apparatus using a wireless signal.

It is noted that since a very high transmission speed may be required when such the super high-definition image or the high-definition motion image is transmitted using a wireless signal, an extremely high frequency band such as millimetric-wave is used. Thus, if a communication is performed using such the extremely high frequency band, electric wave thereof goes strongly straight ahead and a high-gain antenna system is use to establish communication effectively with less transmission power. This eliminates a communication utilizing diffraction or reflection of the electric wave. For example, in a wireless communication system shown in FIG. 1, an informational signal generated in a transmission signal generation unit 1 is transmitted from an antenna of a transmission unit 2 using a wireless signal. An antenna of a reception unit 3 then receives the wireless signal. Received-signal-processing unit 4 performs any processing on the informational signal given therefrom. In such the wireless communication system, if any person 5 enters into a communication path for the wireless signal, he or she may block the wireless signal to stop the wireless communication. Alternatively, if the transmission unit 2 and the reception unit 3 are positioned to prevent the wireless signal from being blocked, installation positions for them are limited. For example, the transmission unit 2 and the reception unit 3 may have to be installed near a ceiling.

Plural pairs of the transmission unit 2 and the reception unit 3 are provided as shown in FIG. 2 so that if the communication signal is blocked in a communication path, it is possible to prevent the communication from being blocked by using the other communication path. Japanese Unexamined Patent Publication No. 2001-44900 discloses a wireless communication system utilizing a method for using such the plural communication paths. In this publication, a wireless communication system with an antenna diversity using plural transmission antennas, for example, is disclosed.

SUMMARY OF THE INVENTION

However, if using the plural communication paths, lengths of the respective paths may be different from each other based on their installation positions. If wireless communication is performed using an extremely high frequency band such as millimetric-wave, a time difference between the wireless signals that occurs based on the difference of the lengths of the respective paths cannot be ignored. It is difficult to supply the received-signal-processing unit 4 with a proper informational signal only by switching informational signals obtained by the plural reception units in a signal-switching unit 6.

For example, if merely switching informational signals obtained by the plural reception units when the time difference between the wireless signals that occurs based on the difference of the lengths of the respective paths exceeds over a period of time for one bit (or one symbol) of the transmission signal, a lack or overlap of bit (or symbol) may occur. This fails to supply the received-signal-processing unit 4 with a proper informational signal. Alternatively, if the wireless signal is blocked according to a slow action such as a movement of human being, communication quality may alter frequently at a beginning time and a completion time of the blocking. It is thus necessary to switch the signals to obtain a proper informational signal.

It is desirable to provide wireless communication system, reception apparatus, and reception method in which plural wireless signals having different communication paths are received and preferred output signal is then given.

According to an embodiment of the invention, there is provided a wireless communication system having transmission apparatus and reception apparatus. The transmission apparatus transmits a wireless signal based on a transmission unit in which an informational signal is divided and a synchronization signal is added to the divided one. The reception apparatus includes plural reception devices that receive the wireless signal to obtain the informational signals and output-controlling device that selects any informational signal from the informational signals obtained by the plural reception devices. Each of the plural reception devices has communication-quality-detecting device that detects communication quality of the received wireless signal. Each of the plural reception devices also has storing device that stores the informational signal obtained by the reception device. Each of the plural reception devices further has synchronization-detection-storage-controlling device that detects the synchronization signal from the received wireless signal and controls the storing device to store the informational signal based on a detected result of the synchronization signal. The output-controlling device reads the informational signals out of the storing devices of the plural reception devices with the informational signals being synchronized with each other after the plural reception devices have detected the synchronization signals, selects from the plural reception devices the reception device having satisfactory communication quality based on a detected result of the communication quality by the plural reception devices, and outputs the informational signal read out of the selected reception device.

According to another embodiment of the invention, there is provided a reception apparatus. The reception apparatus includes plural reception devices that receive a wireless signal transmitted on the basis of a transmission unit in which an informational signal is divided and a synchronization signal is added to the divided one to obtain the informational signals. The reception apparatus also includes output-controlling device that selects any informational signal from the informational signals obtained when the plural reception devices receive the wireless signal. Each of the plural reception devices has communication-quality-detecting device that detects communication quality of the received wireless signal. Each of the plural reception devices also has storing device that stores the informational signal obtained by the reception device. Each of the plural reception devices further has synchronization-detection-storage-controlling device that detects the synchronization signal from the received wireless signal and controls the storing device to store the informational signal based on a detected result of the synchronization signal. The output-controlling device reads the informational signals out of the storing devices of the plural reception devices with the informational signals being synchronized with each other after the plural reception devices have detected the synchronization signals, selects from the plural reception devices the reception device having satisfactory communication quality based on a detected result of the communication quality by the plural reception devices, and outputs the informational signal read out of the selected reception device.

According to further embodiment of the invention, there is provided a reception method wherein plural reception devices receive a wireless signal transmitted on the basis of a transmission unit in which an informational signal is divided and a synchronization signal is added to the divided one to obtain the informational signal. The method includes a communication-quality-detecting step of detecting communication quality of the received wireless signal. The method also includes a synchronization-detection-storage-controlling step of detecting the synchronization signal from the received wireless signal and controlling storing device to store the informational signal based on a detected result of the synchronization signal. The method further includes an output-controlling step of reading the informational signals out of the storing devices of the plural reception devices with the informational signals being synchronized with each other after the plural reception devices have detected the synchronization signals, selecting from the plural reception devices the reception device having satisfactory communication quality based on a detected result of the communication quality by the plural reception devices, and outputting the informational signal read out of the selected reception device.

In the embodiments of the invention, a wireless signal is transmitted from the transmission apparatus based on a transmission unit in which an informational signal is divided and a synchronization signal is added to the divided one. The reception apparatus includes plural reception devices that receive the wireless signal. The synchronization signal is detected from the wireless signal received by each of the reception devices. The storing device stores at least an informational signal corresponding to a time difference due to a difference in communication paths relative to the wireless signals received by the plural reception devices and an informational signal corresponding to a period of time necessary for detection of communication quality based on a detected result of the synchronization signal. The stored informational signals are read out with the informational signals being synchronized with each other after each of the plural reception devices has detected the synchronization signals. The informational signal obtained by the reception device determined as having satisfactory communication quality such as signal strength of the received wireless signal and frequency of error in the received wireless signal is selected and output.

Thus, if wireless signal is blocked in any communication paths, the embodiment of the wireless communication system according to the invention can output the informational signal. If there occurs a difference in the communication paths of the plural reception devices, the embodiment of the wireless communication system according to the invention can output a proper informational signal.

Since at least an informational signal corresponding to a time difference due to a difference in communication paths relative to the wireless signals received by the plural reception means is successively stored, the embodiment of the wireless communication system according to the invention surely can buffer any delay in the informational signal due to a difference in communication paths relative to the wireless signals.

Since an informational signal corresponding to a period of time necessary for detection of communication quality is stored, if a period of time necessary for detection of communication quality is made longer, the embodiment of the wireless communication system according to the invention surely can select and output the informational signal received by the reception device having satisfactory communication quality.

Reading the informational signals out of the storing devices is started after a period of time necessary for detection of communication quality is passed since the plural reception means have detected the synchronization signals. This allows the informational signals stored in the storing devices of the plural reception devices to be read out thereof with them being synchronized with each other surely. This also allows the informational signal received by the reception device having satisfactory communication quality to be properly selected and output.

When switching the reception device to be selected based on the detected result of the communication quality, the reception device that has selected before the switch is stopped from being selected during a period of the transmission unit when the reception device is switched.

Thus, if the informational signal is not synchronized with the synchronization signal when it returns to a situation where communication quality is satisfactory, this prevents such the informational signal from being selected, thereby avoiding improper switching to output only the informational signal that is synchronized with the synchronization signal.

When the storing device stores a pair of the informational signal and the detected result of the communication quality when receiving the informational signal, the detected results of the communication qualities are read out of the storing devices with the results being synchronized with each other. From the plural reception devices the reception device having satisfactory communication quality is selected. Output is then the informational signal paired with the detected result of the communication quality read out of the selected reception device. This allows the informational signal to be properly selected on the basis of the detected result of the communication quality.

Alternatively, determined is time difference due to a difference in communication paths relative to the wireless signals based on the detected result of the synchronization signal, so that the detected results of the communication qualities can be synchronized with each other based on the determined results, thereby determining a reception device having satisfactory communication quality. This allows the informational signal to be properly selected on the basis of the detected result of the communication quality even if storing no detected result of the communication quality.

The informational signal to be stored in the storing device and a signal used for detecting the synchronization signal are delayed only by a period of time necessary for detection of the communication quality in the communication quality detection device. Thus, the informational signal and the detected result of the communication quality have the same timing so that it is possible to easily select the informational signal based on the detected result of the communication quality.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a diagram for showing a configuration of a wireless communication system according to related art;

FIG. 2 is a diagram for showing a configuration of another wireless communication system according to related art;

DESCRIPTION OF THE INVENTION

Figure 3:
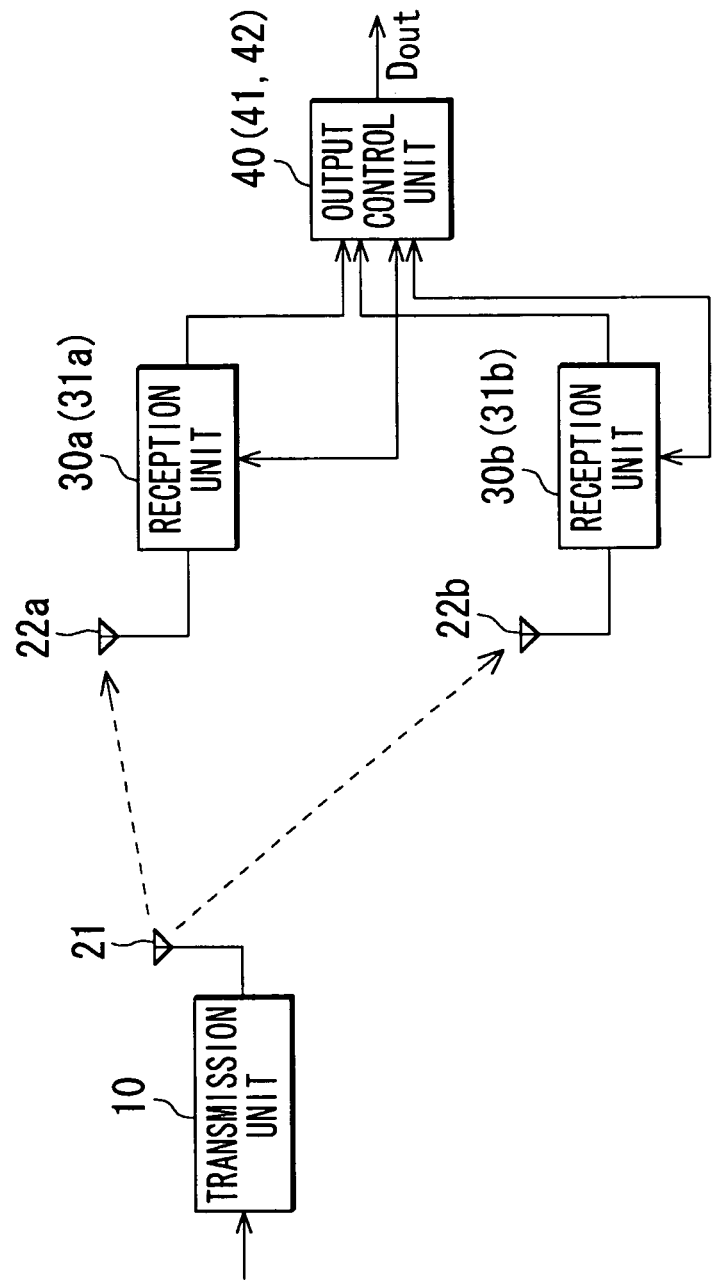
FIG. 3 is a diagram for showing a configuration of an embodiment of a wireless communication system according to the invention.

Referring now to the drawings, preferred embodiments of the invention will be described specifically below. FIG. 3 shows a configuration of an embodiment of a wireless communication system according to the invention according to path diversity.

This embodiment of a wireless communication system is used when an antenna of a transmission apparatus has wide beam width. For example, an antenna 22a connected with a reception unit 30a (31a) of reception apparatus and an antenna 22b connected with a reception unit 30b (31b) of reception apparatus receive a wireless signal transmitted from an antenna 21 connected with a transmission unit 10. An output control unit 40 (41, 42) compares communication quality in the reception unit 30a when receiving the wireless signal with communication quality in the reception unit 30b when receiving the wireless signal. The output control unit 40 (41, 42) then determines which one of the communication qualities is satisfactory and outputs only the informational signal obtained by the reception unit determined as having satisfactory communication quality. Since it is not necessary to provide the numbers of transmission units corresponding to those of the reception units in this embodiment, the wireless communication system can be configured at low cast.

Figure 4:
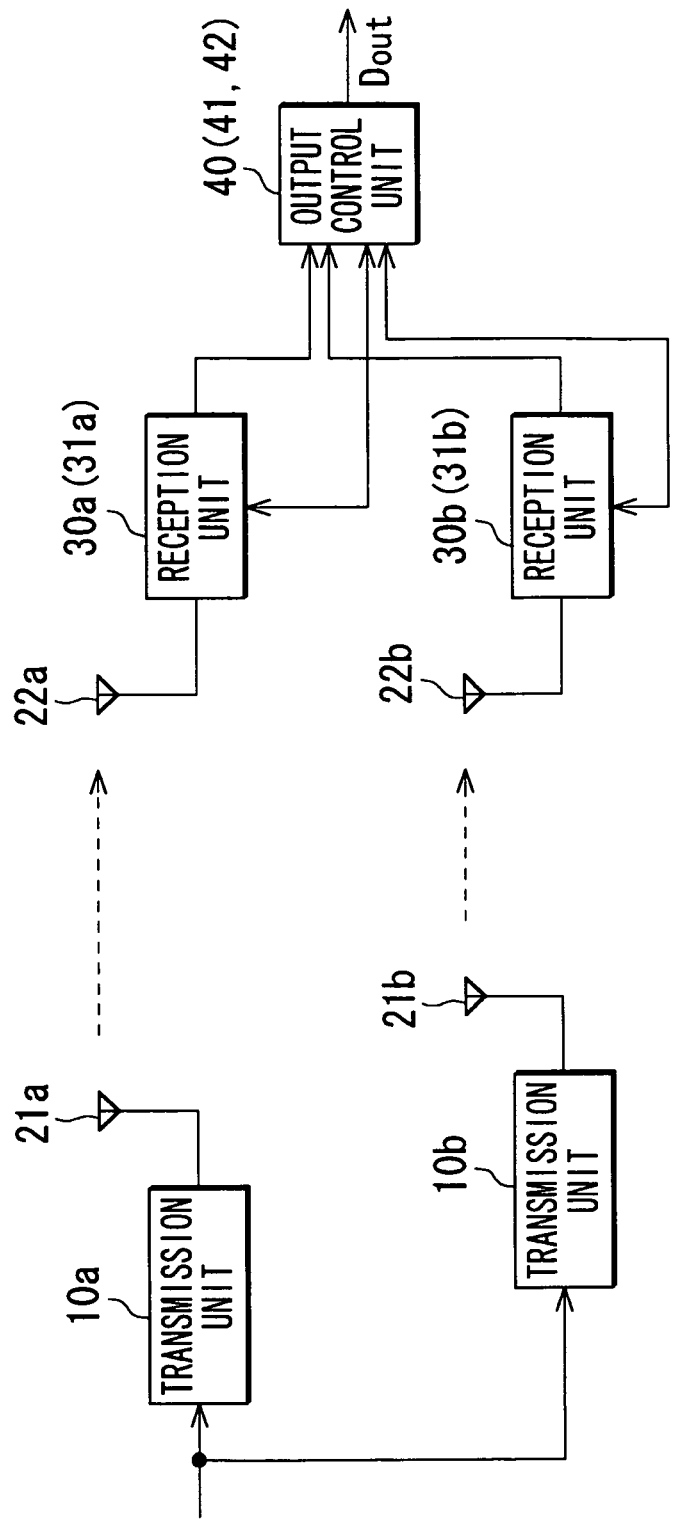
FIG. 4 is a diagram for showing a configuration of another embodiment of a wireless communication system according to the invention.

FIG. 4 shows a configuration of another embodiment of a wireless communication system according to the invention according to path diversity.

This embodiment of a wireless communication system is used when an antenna of a transmission apparatus has narrow beam width. For example, two transmission units 10a, 10b are provided. An antenna 22a connected with a reception unit 30a (31a) of the reception apparatus receives a wireless signal transmitted from an antenna 21a connected with a transmission unit 10a. An antenna 22b connected with a reception unit 30b (31b) of the reception apparatus receives a wireless signal transmitted from an antenna 21b connected with a transmission unit 10b. It is noted that if beam width is not sufficiently narrow, in order to prevent two communication paths to be blocked, the wireless signal transmitted from the antennas 21a, 21b may have different frequencies or use polarized waves. The beam widths of the antennas 21a, 21b may be made sufficiently narrow. The antennas 21b, 22b may be set away from the antennas 21a, 22a and grounded. An output control unit 40 (41, 42) compares communication quality in the reception unit 30a (31a) when receiving the wireless signal with communication quality in the reception unit 30b (31b) when receiving the wireless signal. The output control unit 40 (41, 42) then determines which one of the communication qualities is satisfactory and outputs only the informational signal obtained by the reception unit determined as having satisfactory communication quality. Since the transmission unit and the reception unit are paired in this embodiment, this embodiment of the wireless communication system is effective in a case where wireless communication having a high transmission speed is performed with a small amount of transmission power if using narrow beam width and frequency band in which electric wave goes strongly straight ahead.

Figure 5:
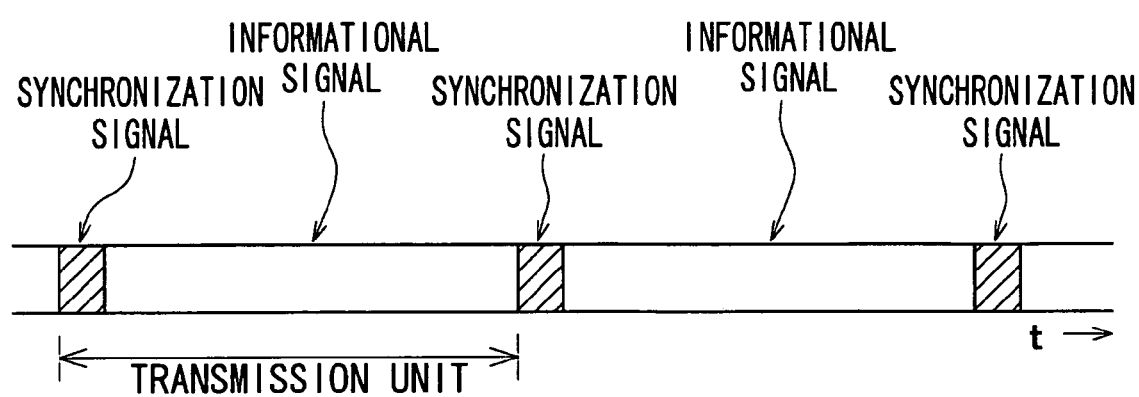
FIG. 5 is a diagram for showing a transmission signal.

FIG. 5 shows a signal transmitted from the transmission unit as wireless signal. This signal is transmitted based on transmission unit in which an informational signal is divided and a synchronization signal, which can be detected in physical layer of the reception unit, for example, is added to the divided one.

Figure 6:
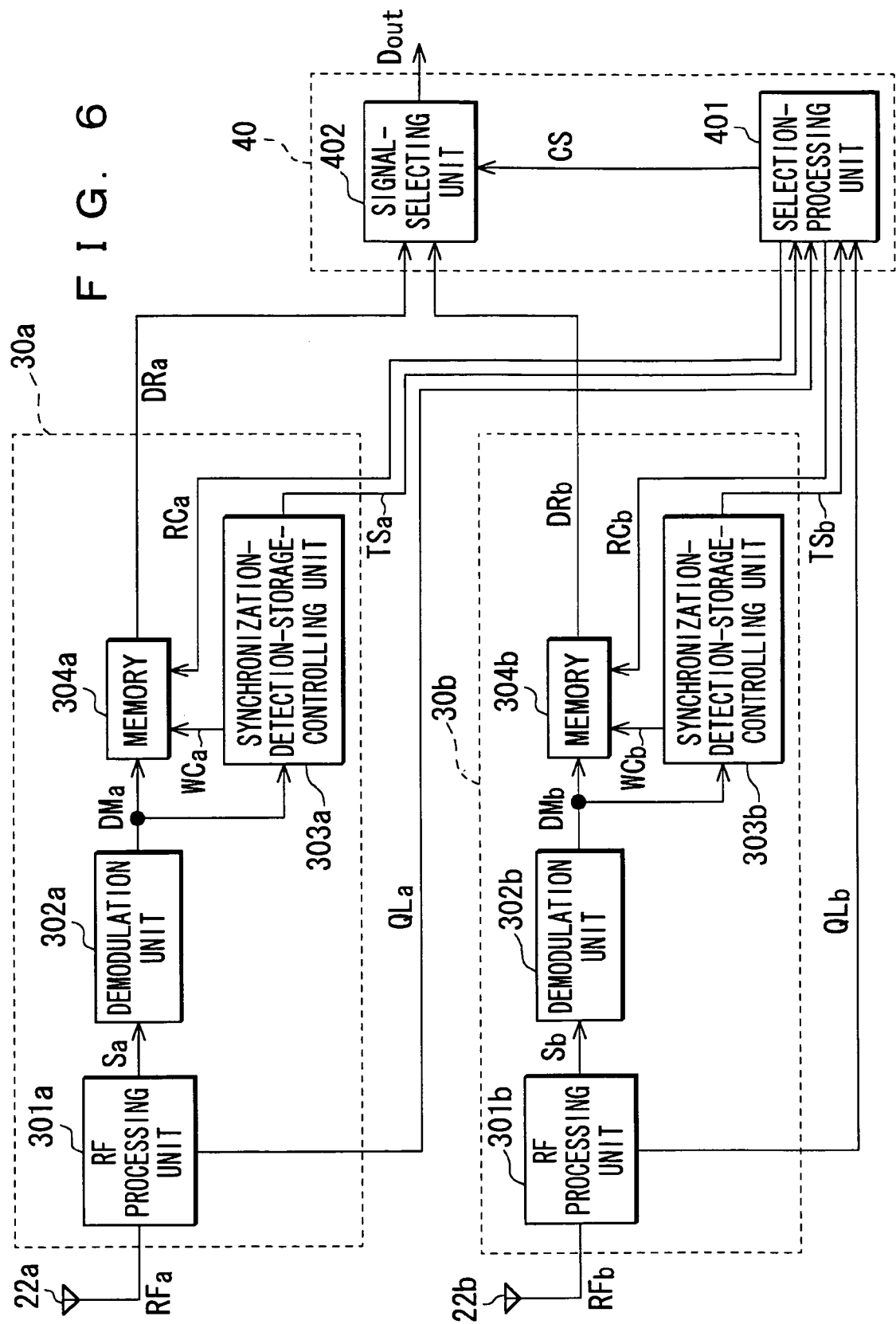
FIG. 6 is a diagram for showing a configuration of an embodiment of a reception apparatus according to the invention.

FIG. 6 shows a configuration of the reception apparatus. An antenna 22a connected with a reception unit 30a receives a wireless signal to obtain a received signal RFa that is then supplied to an RF processing unit 301a. The RF processing unit 301a amplifies the received signal RFa and downconverts it to obtain a baseband signal Sa that is then supplied to a demodulation unit 302a. The RF processing unit 301a also serves as communication quality detection means and generates communication quality information QLa indicating a detected result of the communication quality to supply it to a selection-processing unit 401 of an output control unit 40. For example, the RF processing unit 301a detects signal strength of the received signal RFa and supplies the detected result thereof to the selection-processing unit 401 as the communication quality information QLa.

The demodulation unit 302a demodulates the supplied baseband signal Sa to obtain demodulation data DMa and supplies it to a synchronization-detection-storage-controlling unit 303a and a memory 304a.

The synchronization-detection-storage-controlling unit 303a detects synchronization signal from the demodulation data DMa to generate a synchronization timing signal TSa indicating the detected result thereof and supplies it to the selection-processing unit 401. The unit 303a also generates a write control signal WCa on the basis of the detected synchronization signal and supplies it to the memory 304a that stores an informational signal included in the demodulation data DMa.

The informational signal Dwa stored in the memory 304a is read out based on a read control signal RCa that is supplied from the selection-processing unit 401. The informational signal is then supplied to a signal-selecting unit 402 of the output control unit 40 as an informational signal DRa.

A reception unit 30b has the same configuration as that of the reception unit 30a. An antenna 22b connected with a reception unit 30b receives a wireless signal to obtain a received signal RFb that is then supplied to an RF processing unit 301b. The RF processing unit 301b amplifies the received signal RFb and downconverts it to obtain a baseband signal Sb that is then supplied to a demodulation unit 302b. The RF processing unit 301b also serves as communication quality detection means and detects signal strength of the received signal RFb, as doing so in the RF processing unit 301a, to supply a detected result of the communication quality as communication quality information QLb to the selection-processing unit 401.

The demodulation unit 302b demodulates the supplied baseband signal Sb to obtain demodulation data DMb and supplies it to a synchronization-detection-storage-controlling unit 303b and a memory 304b.

The synchronization-detection-storage-controlling unit 303b detects synchronization signal from the demodulation data DMb to generate a synchronization timing signal TSb indicating the detected result thereof and supplies it to the selection-processing unit 401. The unit 303b also generates a write control signal WCb on the basis of the detected synchronization signal and supplies it to the memory 304b that stores an informational signal included in the demodulation data DMb.

The informational signal DWb stored in the memory 304b is read out based on a read control signal RCb that is supplied from the selection-processing unit 401. The informational signal is then supplied to the signal-selecting unit 402 of the output control unit 40 as an informational signal DRb.

The selection-processing unit 401 controls read timing of the signals read out of the memories 304a, 304b based on the synchronization timing signals TSa, TSb to generate a read control signal RC (to which a combination of the read control signals RCa, RCb is referred) and to supply the control signal RC to the memories 304a, 304b in order to read the informational signals Dwa, DWb out of the memories 304a, 304b with the informational signals being synchronized with each other. Namely, the control signal RC is supplied to the memories 304a, 304b at timing later than the synchronization timing of the received signal RFa, RFb so that the informational signals Dwa, DWb read out of the memories 304a, 304b can be supplied at same timing to the signal-selecting unit 402. In order to supply the informational signals Dwa, DWb at same timing to the signal-selecting unit 402, the memories 304a, 304b successively store at least the informational signals Dwa, DWb each corresponding to a time difference due to a difference in communication paths relative to the wireless signals received by the reception units 30a, 30b.

The selection-processing unit 401 generates a selection signal CS to supply it to the signal-selecting unit 402. The selection signal CS is used for selecting from the plural reception units the reception unit having satisfactory communication quality based on the communication quality information QLa supplied by the RF processing unit 301a of the reception unit 30a and the communication quality information QLb supplied by the RF processing unit 301b of the reception unit 30b to make the read informational signal output from the selected reception unit.

If it takes a lot of time to detect communication quality, namely, to generate the communication quality information QLa, QLb and select the reception unit having satisfactory communication quality based on the communication quality information QLa, QLb, the selection signal CS is delayed by a period of time necessary for detection of the communication quality. This allows the informational signal obtained by the reception unit having satisfactory communication quality to be properly selected using the selection signal CS. In this case, the memories 304a, 304b further store the informational signals each corresponding to a period of time necessary for detection of communication quality in order to be able to supply the informational signals read out of the memories 304a, 304b to the signal-selecting unit 402 at the same timing if it takes a lot of time to detect communication quality.

The signal-selecting unit 402 outputs the informational signal that is supplied from the memory of the selected reception unit based on the selection signal CS that is supplied from the selection-processing unit 401. For example, when the reception unit 30a is selected as the reception unit having satisfactory communication quality, the informational signal DRa supplied from the memory 304a is output as the output signal Dout. Alternatively, when the reception unit 30b is selected as the reception unit having satisfactory communication quality, the informational signal DRb supplied from the memory 304a is output as the output signal Dout.

Figure 7:
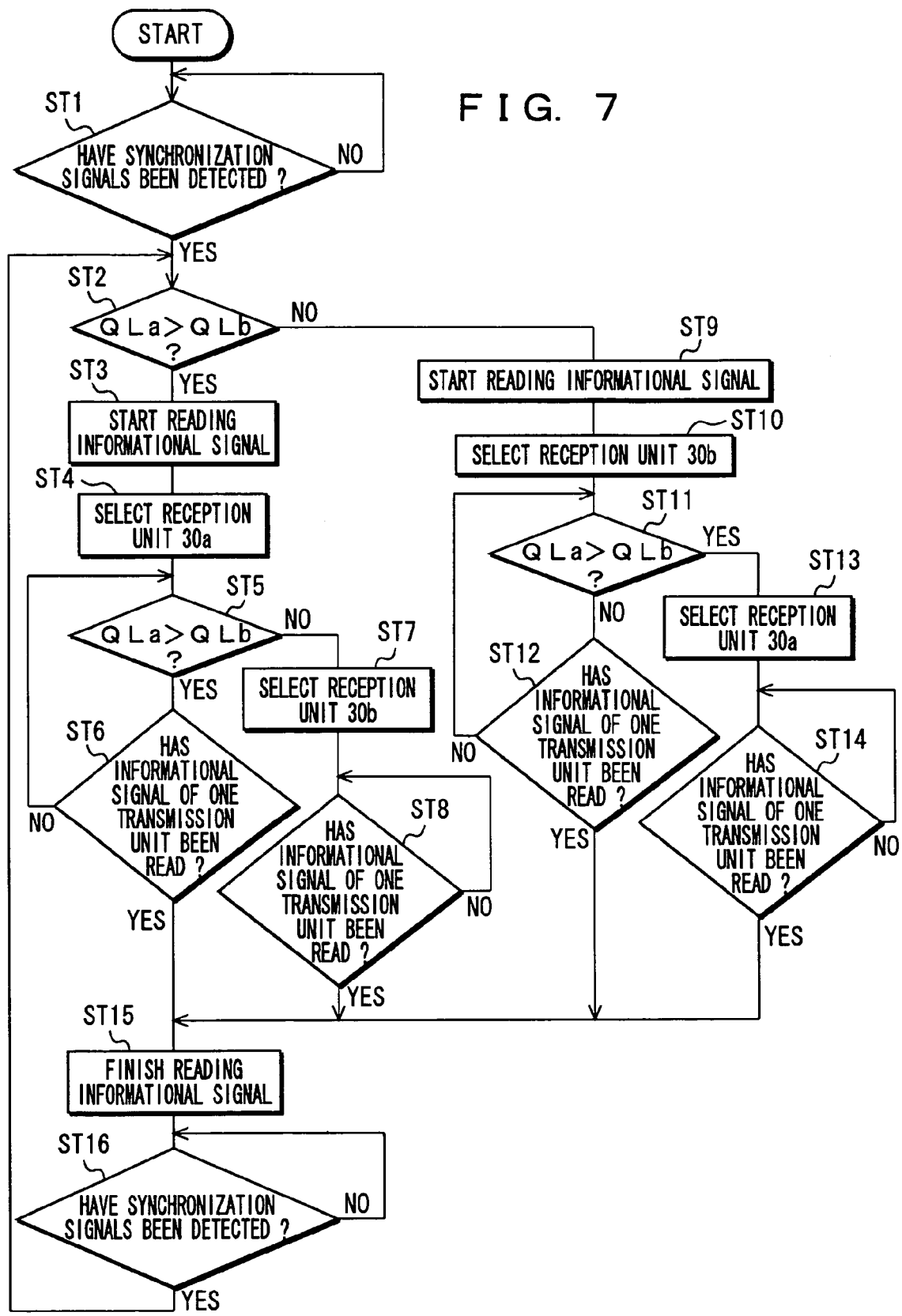
FIG. 7 is a flowchart for indicating operations of selection-processing unit.

FIG. 7 illustrates a flowchart for indicating operations of the selection-processing unit 401. At step ST1, the selection-processing unit 401 determines whether the synchronization signals have been detected in the reception units 30a, 30b based on the synchronization timing signals TSa, TSb. If every synchronization signal has not yet been detected, the process goes back to step ST1. If every synchronization signal has been detected, the process goes to step ST2.

At step ST2, the selection-processing unit 401 compares the communication quality information QLa supplied from the reception unit 30a with the communication quality information QLb supplied from the reception unit 30b to determine whether the communication quality information QLa is more satisfactory than the communication quality information QLb. If the communication quality information QLa is more satisfactory than the communication quality information QLb, the process goes to step ST3. If the communication quality information QLa is not more satisfactory than the communication quality information QLb, the process goes to step ST9.

At step ST3, the selection-processing unit 401 starts reading the informational signals out of the memories 304a, 304b with the signals being synchronized with each other and the process goes to step ST4. At step ST4, the selection-processing unit 401 selects the reception unit 30a having satisfactory communication quality and generates the selection signal CS for outputting the informational signal DRa supplied from the memory 304a through the signal-selecting unit 402 to supply it to the signal-selecting unit 402.

At step ST5, the selection-processing unit 401 determines whether the communication quality information QLa is more satisfactory than the communication quality information QLb. If the communication quality information QLa is more satisfactory than the communication quality information QLb, the process goes to step ST6. If the communication quality information QLa is not more satisfactory than the communication quality information QLb, the process goes to step ST7.

At step ST6, the selection-processing unit 401 determines whether the informational signal of one transmission unit has been read. If it has not yet been read, the process goes back to step ST5. If it has already been read, the process goes to step ST15.

When the process goes to step ST7 if the communication quality information QLa is not more satisfactory than the communication quality information QLb at step ST5, the selection-processing unit 401 selects the reception unit 30b having satisfactory communication quality and generates the selection signal CS for outputting the informational signal DRb supplied from the memory 304b through the signal-selecting unit 402 to supply it to the signal-selecting unit 402.

At step ST8, the selection-processing unit 401 determines whether the informational signal of one transmission unit has been read. If it has not yet been read, the process goes back to step ST8. If it has already been read, the process goes to step ST15.

When the process goes from step ST2 to step ST9, as doing so in step ST3, the selection-processing unit 401 starts reading the informational signals out of the memories 304a, 304b and the process goes to step ST10. At step ST10, the selection-processing unit 401 selects the reception unit 30b having satisfactory communication quality and generates the selection signal CS for outputting the informational signal DRb supplied from the memory 304b through the signal-selecting unit 402 to supply it to the signal-selecting unit 402.

At step ST11, the selection-processing unit 401 determines whether the communication quality information QLa is more satisfactory than the communication quality information QLb. If the communication quality information QLa is not more satisfactory than the communication quality information QLb, the process goes to step ST12. If the communication quality information QLa is more satisfactory than the communication quality information QLb, the process goes to step ST13.

At step ST12, the selection-processing unit 401 determines whether the informational signal of one transmission unit has been read. If it has not yet been read, the process goes back to step ST11. If it has already been read, the process goes to step ST15.

When the process goes to step ST13 if the communication quality information QLa is more satisfactory than the communication quality information QLb at step ST1, the selection-processing unit 401 selects the reception unit 30a having satisfactory communication quality and generates the selection signal CS for outputting the informational signal DRa supplied from the memory 304a through the signal-selecting unit 402 to supply it to the signal-selecting unit 402.

At step ST14, the selection-processing unit 401 determines whether the informational signal of one transmission unit has been read. If it has not yet been read, the process goes back to step ST14. If it has already been read, the process goes to step ST15.

At step ST15, the selection-processing unit 401 finishes reading the informational signals out of the memories 304a, 304b and the step ST16. At step ST16, the selection-processing unit 401 determines whether the synchronization signals of next transmission unit have been detected in the reception units 30a, 30b based on the synchronization timing signals TSa, TSb. If every synchronization signal has not yet been detected, the process goes back to step ST16. If every synchronization signal has been detected in the reception units 30a, 30b, the process goes to step ST2 where starting reading the informational signal of next transmission unit.

Thus, the selection-processing unit 401 allows the informational signal that is read out of the reception unit determined as having satisfactory communication quality to be output through the signal-selecting unit 402. If communication quality deteriorates on the way of transmission unit, the selection-processing unit 401 allows the informational signal that is read out of the other reception unit determined as having satisfactory communication quality to be output through the signal-selecting unit 402. If communication quality returns from the deteriorated state to satisfactory state on the way of transmission unit, the selection-processing unit 401 controls so that the informational signal selected before the switch is prevented from being output.

Figure 8:
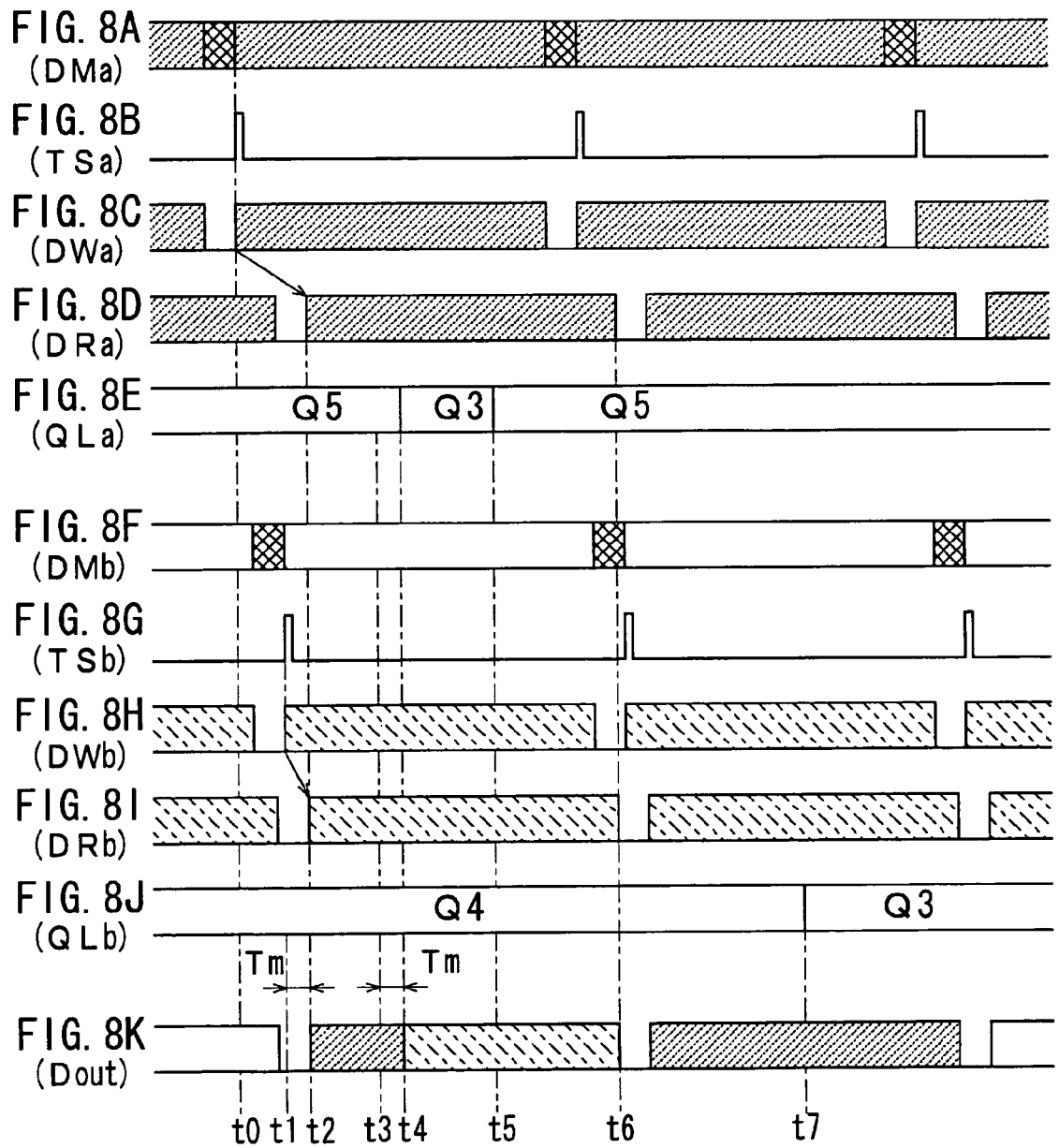
FIGS. 8A through 8K are diagrams each for showing operations of the reception apparatus.

FIGS. 8A through 8K are diagrams each for showing operations of the reception apparatus. FIG. 8A illustrates the demodulation data DMa. The synchronization-detection-storage-controlling unit 303a detects the synchronization signals from the demodulation data DMa and generates the synchronization timing signal TSa as shown in FIG. 8B. The synchronization-detection-storage-controlling unit 303a also generates write control signal WCa synchronized with the synchronization signals of the demodulation data DMa to supply it to the memory 304a that stores the informational signal. It is noted that FIG. 8C illustrates the informational signal DWa stored in the memory 304a.

Similarly, FIG. 8F illustrates the demodulation data DMb. The synchronization-detection-storage-controlling unit 303b detects the synchronization signals from the demodulation data DMb and generates the synchronization timing signal TSb as shown in FIG. 8G. The synchronization-detection-storage-controlling unit 303b also generates write control signal WCb synchronized with the synchronization signals of the demodulation data DMb to supply it to the memory 304b that stores the informational signal. It is noted that FIG. 8H illustrates the informational signal DWb stored in the memory 304b.

When detection of the synchronization signal from the demodulation data DMa has been completed at a point of time t0, the synchronization-detection-storage-controlling unit 303a generates the synchronization timing signal TSa and supplies it to the selection-processing unit 401. It controls the memory 304a to successively store the informational signal following the synchronization signal. When detection of the synchronization signal from the demodulation data DMb has been completed at a point of time t1, the synchronization-detection-storage-controlling unit 303b generates the synchronization timing signal TSb and supplies it to the selection-processing unit 401. It controls the memory 304b to successively store the informational signal following the synchronization signal.

When detection of the synchronization signals has been completed in the reception units 30a, 30b at a point of time t1, the selection-processing unit 401 compares the communication quality information QLa, shown in FIG. 8E, supplied from the RF processing unit 301a of the reception unit 30a with the communication quality information QLb, shown in FIG. 8J, supplied from the RF processing unit 301b of the reception unit 30b and generates the selection signal CS for selecting the informational signal obtained the reception unit that is determined as having satisfactory communication quality. The selection-processing unit 401 supplies the read control signal RC to the memories 304a, 304b, respectively, and reads the informational signals out of the memories 304a, 304b with the informational signals being synchronized with each other. If it takes a period of time Tm to detect the communication quality, at a point of time t2 when at least the period of time Tm is passed since the detection of synchronization signal has been completed at the point of time t1, the selection-processing unit 401 starts generating the selection signal CS and reading the informational signal. It is noted that FIG. 8D illustrates informational signal DRa, which is read out of the memory 304a and is supplied to the signal-selecting unit 402. It is also noted that FIG. 8I illustrates informational signal DRb, which is read out of the memory 304b and is supplied to the signal-selecting unit 402.

When the communication quality information QLa indicates a quality level, Q5, for example, which is more satisfactory than a quality level, Q4, that the communication quality information QLb indicates, the selection-processing unit 401 generates the selection signal CS for selecting the informational signal obtained by the reception unit 30a and supplies it to the signal-selecting unit 402 to output the informational signal DRa as the output signal Dout, shown in FIG. 8K, through the signal-selecting unit 402.

If the communication quality of the reception unit 30a deteriorates at a point of time t3 and the quality level, Q5, that the communication quality information QLa indicates is decreased to a quality level, Q3, at a point of time t4 when the period of time Tm necessary for detection of the communication quality is passed from the point of time t3, the selection-processing unit 401 generates the selection signal CS for selecting the informational signal obtained by the reception unit 30b, which has a quality level, Q4, that is more satisfactory than the quality level, Q3, and supplies it to the signal-selecting unit 402 to output the informational signal DRb as the output signal Dout through the signal-selecting unit 402.

Thus, the informational signals stored in the memories 304a, 304b are read out with the informational signals being synchronized with each other and reading these informational signals can be delayed at least by a period of time Tm necessary for detection of the communication quality. If the quality level, Q5, is decreased to the quality level, Q3, in the reception unit 30a, this allows the informational signal obtained by the reception unit 30a in the deteriorated situation on the quality level to be prevented from being output from the signal-selecting unit 402.

Thereafter, if the quality level, Q3, that the communication quality information QLa indicates is returned to a quality level, Q5, which is satisfactory communication quality, at a point of time t5, the selection-processing unit 401 stops switching the signals by a point of time t6 when the informational signal of one transmission unit has been read to keep the informational signal DRb, which is read out of the reception unit 30b, output as the output signal Dout.

If the detected result of the communication quality in the reception unit 30b indicates that the quality level, Q4, is decreased to a quality level, Q3, at a point of time t7 when the reception unit 30a has been selected and the informational signal DRa read out of the reception unit 30a is being output as the output signal Dout, the selection-processing unit 401 has been selected the reception unit 30a having the quality level, Q5, so that it can keep the informational signal DRa, which is read out of the reception unit 30a, output as the output signal Dout.

Thus, even if the wireless signal of one communication path is blocked or its communication quality deteriorates, selecting the reception unit determined as having satisfactory communication quality and outputting the informational signal obtained by the selected reception unit allows the output signal to be generated on the basis of the wireless signal passing through the other communication path. If there occurs a difference in the communication paths of the wireless communication, it is possible to output the informational signal properly.

Since at least an informational signal corresponding to a time difference due to a difference in communication paths relative to the wireless signals is successively stored in the memory (or memories), it is possible to surely buffer any delay in the informational signal due to a difference in communication paths relative to the wireless signals.

Since an informational signal corresponding to a period of time necessary for detection of communication quality is stored, if a period of time necessary for detection of communication quality is made longer, it is possible to surely output the informational signal obtained by the reception unit having satisfactory communication quality.

Because reading the informational signal is started after a period of time necessary for detection of communication quality is passed since the plural reception units have detected the synchronization signals, it is possible to surely read the stored informational signals with them being synchronized with each other. This also allows the informational signal obtained by the reception unit having satisfactory communication quality to be properly output.

When switching the reception unit if the communication quality deteriorates, the reception unit that has been selected before the switch is stopped from being selected during a period of the transmission unit when the reception unit is switched, even if the communication quality is returned to its satisfactory state. Thus, if the informational signal is not synchronized with the synchronization signal when the communication quality is returned to its satisfactory state, such the informational signal cannot be selected and output. This allows only the informational signal synchronized with the synchronization signal to be output.

Figure 9:
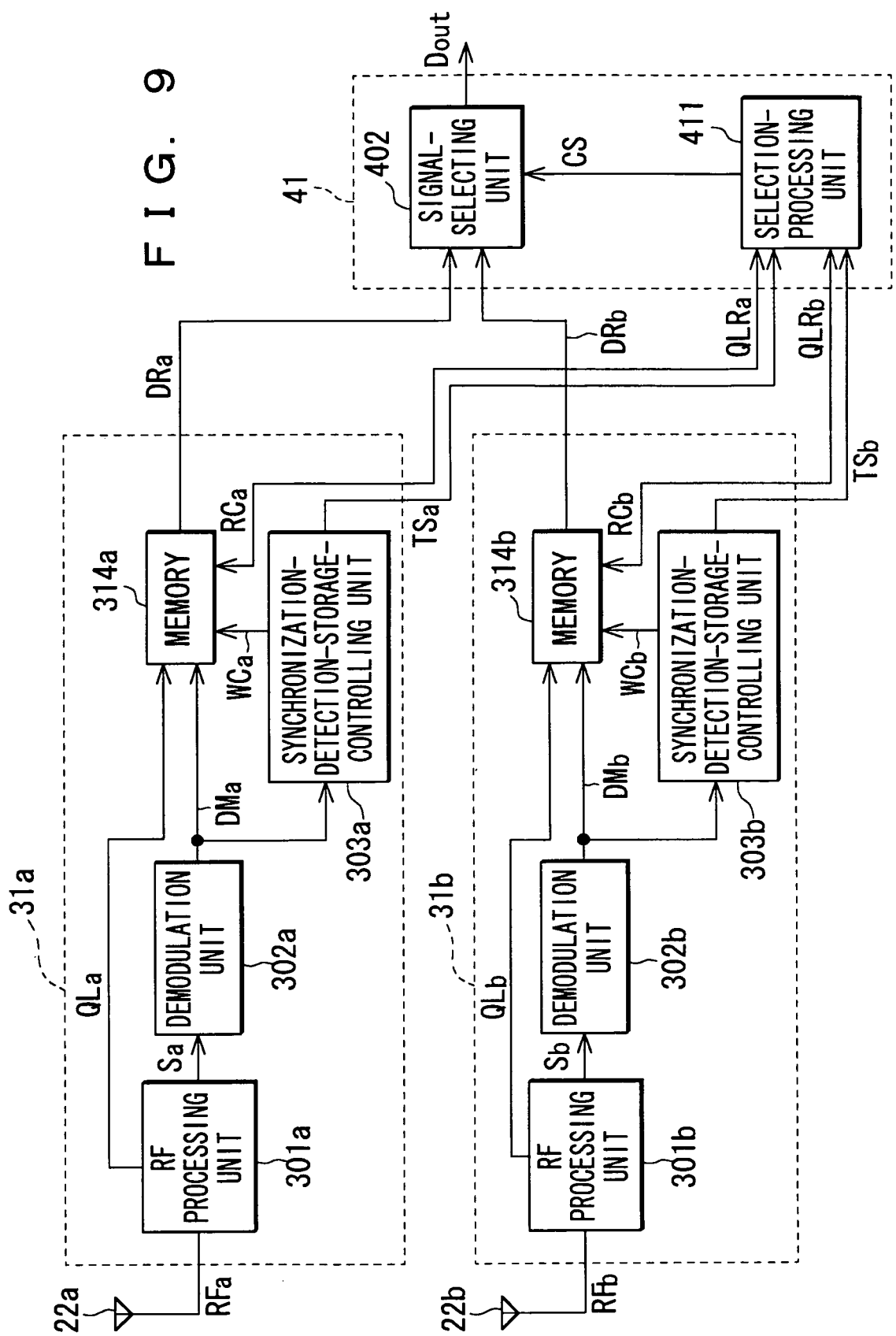
FIG. 9 is a diagram for showing a configuration of another embodiment of a reception apparatus according to the invention.

Since the items of communication quality information to be compared in the output control unit 40 of the above embodiment have a time difference due to a difference in communication paths relative to the wireless signals, the informational signal obtained by the reception unit having satisfactory communication quality may be selected with inaccuracy. It is desirable to provide the reception apparatus in which the reception unit having satisfactory communication quality may be selected with high accuracy regardless of the time difference due to a difference in communication paths. FIG. 9 shows such the reception apparatus. In FIG. 9, like members are referred to like reference numbers and characters used in the FIG. 6, detailed description of which will be omitted.

An RF processing unit 301a of a reception unit 31a amplifies a received signal RFa and downconverts it to obtain a baseband signal Sa that is then supplied to a demodulation unit 302a. The RF processing unit 301a also detects as communication quality information QLa signal strength of the received signal to supply it to a memory 314a.

The memory 314a stores a pair of the informational signal included in the demodulation data DMa and the communication quality information QLa when receiving the informational signal on the basis of the write control signal WCa supplied from the synchronization-detection-storage-controlling unit 303a.

The informational signal DWa and the communication quality information QLa which are stored in the memory 314a are read out on the basis of the read control signal RC supplied from the selection-processing unit 401. The read informational signal is supplied to the signal-selecting unit 402 of an output control unit 41 as the informational signal DRa. The read communication quality information is supplied to the selection-processing unit 411 of the output control unit 41 as the communication quality information QLRa.

The reception unit 31b has the same configuration as that of the reception unit 31a. An RF processing unit 301b thereof amplifies a received signal RFb and downconverts it to obtain a baseband signal Sb that is then supplied to a demodulation unit 302b. The RF processing unit 301b also detects as communication quality information QLb signal strength of the received signal to supply it to a memory 314b.

The memory 314b stores a pair of the informational signal included in the demodulation data DMb and the communication quality information QLb when receiving the informational signal on the basis of the write control signal WCb supplied from the synchronization-detection-storage-controlling unit 303b.

The informational signal DWb and the communication quality information QLb which are stored in the memory 314b are read out on the basis of the read control signal RC supplied from the selection-processing unit 401. The read informational signal is supplied to the signal-selecting unit 402 of the output control unit 41 as the informational signal DRb. The read communication quality information is supplied to the selection-processing unit 411 of the output control unit 41 as the communication quality information QLRb.

The selection-processing unit 411 controls read timing of the signals out of the memories 314a, 314b on the basis of the synchronization signals TSa, TSb and generates the read control signal RC for reading the informational signals DWa, DWb and the communication quality information QLa, QLb paired with the informational signals DWa, DWb, which are stored in the memories 314a, 314b, respectively, with them being synchronized with each other to supply the read control signal RC to the memories 314a, 314b. The selection-processing unit 411 also selects the reception unit having satisfactory communication quality based on the communication quality information QLRa read out of the memory 314a and the communication quality information QLRb read out of the memory 314b and generates the selection signal CS for outputting the informational signal read out of the selected reception unit through the signal-selecting unit 402 to supply it to the signal-selecting unit 402.

Thus, the informational signal and the communication quality information when receiving the informational signal are stored in the memory as a pair and then the informational signal and the communication quality information paired with the informational signal are read out with them being synchronized with each other. Selecting the reception units based on the read communication quality information allows the reception unit having satisfactory communication quality to be properly selected regardless of a time difference due to a difference in communication paths relative to the wireless signals received in the reception units. This allows the informational signal obtained by the reception unit having satisfactory communication quality to be output.

Figure 10:
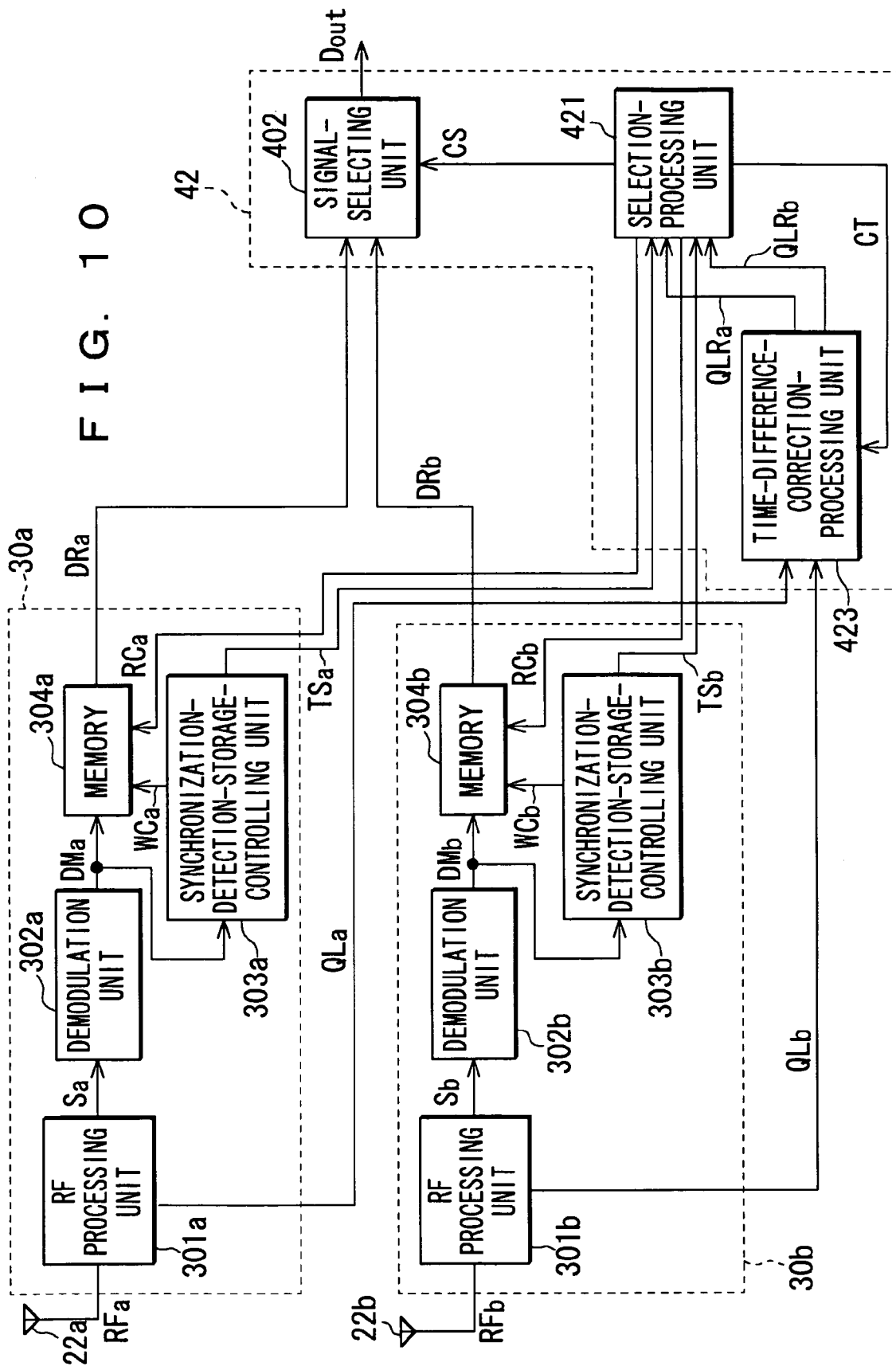
FIG. 10 is a diagram for showing a configuration of further embodiment of a reception apparatus according to the invention.

When a pair of the informational signal and the communication quality information is stored in the memory, an amount of information to be stored in the memory is made larger. It is desirable to provide the reception apparatus in which the reception unit having satisfactory communication quality may be selected with high accuracy with out increasing the amount of information to be stored in the memory. FIG. 10 shows such the reception apparatus. In FIG. 10, like members are referred to like reference numbers and characters used in the FIG. 6, detailed description of which will be omitted.

An RF processing unit 301a of a reception unit 30a amplifies a received signal RFa and downconverts it to obtain a baseband signal Sa that is then supplied to a demodulation unit 302a. The RF processing unit 301a also detects as communication quality information QLa signal strength of the received signal to supply it to a time-difference-correction-processing unit 423 of an output control unit 42.

An RF processing unit 301b thereof amplifies a received signal RFb and downconverts it to obtain a baseband signal Sb that is then supplied to a demodulation unit 302b. The RF processing unit 301b also detects as communication quality information QLb signal strength of the received signal to supply it to the time-difference-correction-processing unit 423.

The time-difference-correction-processing unit 423 delays the communication quality information generated in the reception unit having a shorter communication path of the wireless signal only by a period of time corresponding to a time difference due to a difference in communication paths on the basis of correction control signal CT supplied from a selection-processing unit 421, which will be described later. This allows the communication quality information generated in the reception unit having a shorter communication path to be supplied to the selection-processing unit 421 with the communication quality information thus generated being synchronized with the communication quality information generated in the reception unit having a communication path that is not shorter. For example, if a communication path in the reception unit 30a is shorter than that in the reception unit 30b, the time-difference-correction-processing unit 423 delays the communication quality information QLa only by a period of time corresponding to a time difference due to a difference in communication paths and supplies it to the selection-processing unit 421 as communication quality information QLRa. The time-difference-correction-processing unit 423 also supplies the communication quality information QLb to the selection-processing unit 421 as communication quality information QLRb. Thus, the time-difference-correction-processing unit 423 also supplies items of the communication quality information QLa, QLb to the selection-processing unit 421 as items of the communication quality information QLRa, QLRb with the items of the communication quality information QLa, QLb being synchronized with each other.

The selection-processing unit 421 determines the time difference due to a difference in communication paths relative to the wireless signals in the reception units 30a, 30b based on the synchronization timing signals TSa, TSb, and generates the correction control signal CT for synchronizing the communication quality information QLa with the communication quality information QLb to supply it to the time-difference-correction-processing unit 423.

The selection-processing unit 421 also controls read timing of the signals out of the memories 304a, 304b and generates the read control signal RC for reading the informational signals DWa, DWb, which are stored in the memories 304a, 304b, respectively, with them being synchronized with each other to supply the read control signal RC to the memories 304a, 304b. The selection-processing unit 421 also selects the reception unit having satisfactory communication quality based on the communication quality information QLRa and the communication quality information QLRb, which are supplied from the time-difference-correction-processing unit 423, and generates the selection signal CS for outputting the informational signal read out of the selected reception unit through the signal-selecting unit 402 to supply it to the signal-selecting unit 402.

Thus, the items of the communication quality information, QLRa, QLRb, are synchronized with each other in the time-difference-correction-processing unit 423. Selecting the reception units based on the items of the synchronized communication quality information QLRa, QLRb allows the reception unit having satisfactory communication quality to be properly selected regardless of a time difference due to a difference in communication paths. This also allows the informational signal obtained by the reception unit having satisfactory communication quality to be output. It is not necessary for any memories to store the communication quality information QLRa, QLRb.

If the above embodiment further includes a delay unit to delay a supply of demodulation data to be supplied to the memory and the synchronization-detection-storage-controlling unit only by a period of time necessary for detection of the communication quality, timings of detected result of the communication quality, the information signals, and the like are identical to each other. This allows the informational signal to be easily selected on the basis of the detection of the communication quality. In this case, if the memory stores at least an informational signal corresponding to a time difference due to a difference in communication paths relative to the wireless signals received by the plural reception units, it is possible to select the informational signal obtained by the reception unit having satisfactory communication quality and to output the proper informational signal.

If header information is inserted into the transmission unit to identify it, the output control unit can select the informational signal in the identical transmission unit based on the header information. Thereby, it is possible to select the informational signal obtained by the reception unit having satisfactory communication quality and to output the proper informational signal if the time difference due to a difference in communication paths is made longer than one transmission unit.

Although the communication quality information indicating detected result of the communication quality has been described as a detected result of the signal strength of the received signal in the above embodiments, the invention is not limited to this. For example, the transmission device can add an error correction code to the informational signal of block unit and transmits it so that an error correction is performed in a demodulation unit of the reception apparatus, thereby allowing frequency of error detected during the error correction processing to be supplied to the output control unit as the communication quality information. It is noted that if the frequency of error is used as the communication quality information, the output control unit selects and outputs the informational signal by a block unit.

Although it has been described in the above embodiments that the signal-selecting unit 402 selects one from the informational signals read out of the memories 304*a*, 304*b*, the invention is not limited to this. It can read the informational signal out of only the memory of the reception unit determined as having satisfactory communication quality and output this read informational signal as the output signal Dout. If so, it is unnecessary to provide the signal-selecting unit 402, thereby enabling the output control unit to be simply configured.

Thus, the embodiments of the invention are preferably applied to a wireless communication system, a reception apparatus, and a reception method, which are useful for a case where the wireless communication is performed under the condition that a communication path is blocked, or preferably useful for a case where the wireless communication is performed using an extremely high frequency band.

It should be understood by those skilled in the art that various modifications, combinations, sub-combinations and alternations may occur depending on design requirements and other factors insofar as they are within the scope of the appended claims or the equivalents thereof.

What is claimed is:

1. A wireless communication system comprising:
transmission apparatus configured to transmit a millimetric-wave extremely high frequency wireless signal based on a transmission unit in which an informational signal is divided and a synchronization signal is added to the divided informational signal; and
reception apparatus including plural reception means for receiving the millimetric-wave extremely high frequency wireless signal to obtain the informational signals and output-controlling means for selecting any informational signal from the informational signals obtained by the plural reception means,
wherein each of the plural reception means includes
communication quality detection means for detecting communication quality of the received millimetric-wave extremely high frequency wireless signal;
demodulation means for demodulating the received millimetric-wave extremely high frequency wireless signal into a demodulated informational signal;
storing means for storing the demodulated informational signal obtained by the reception means; and
synchronization-detection-storage-controlling means for detecting the synchronization signal from the demodulated millimetric-wave extremely high frequency wireless signal, generating a write control signal based on the detected synchronization signal, and controlling the storing means to store the demodulated informational signal based on the write control signal, and
wherein the output-controlling means reads the demodulated informational signals out of the storing means of the plural reception means with the demodulated informational signals being synchronized with each other after the plural reception means have detected the synchronization signals, selects from the plural reception means the reception means having satisfactory communication quality based on a detected result of the communication quality by the plural reception means, and outputs the demodulated informational signal read out of the selected reception means, and wherein the communication quality detection means detects signal strength of the received millimetric-wave extremely high frequency wireless signal as communication quality.

2. The wireless communication system of claim 1, wherein the storing means successively stores at least a demodulated informational signal corresponding to a time difference due to a difference in communication paths relative to the millimetric-wave extremely high frequency wireless signals received by the plural reception means.

3. The wireless communication system of claim 2, wherein the storing means further stores a demodulated informational signal corresponding to a period of time necessary for detection of communication quality in the communication quality detection means.

4. The wireless communication system of claim 3, wherein the output-controlling means starts reading the demodulated informational signal at least after a period of time necessary for detection of communication quality is passed since the plural reception means have detected the synchronization signals.

5. The wireless communication system of claim 1, wherein the communication quality detection means detects frequency of error in the received millimetric-wave extremely high frequency wireless signal as communication quality.

6. The wireless communication system of claim 1, wherein when the reception means to be selected based on the detected result of the communication quality is switched, the output-controlling means stops the reception means selected before the switch from being selected during a period of the transmission unit when the reception means is switched.

7. The wireless communication system of claim 1, wherein the storing means stores a pair of the demodulated informational signal and the detected result of the communication quality when receiving the demodulated informational signal; and
wherein the output-controlling means reads the detected results of the communication qualities out of the storing means of the plural reception means with the results being synchronized with each other, to select from the plural reception means the reception means having satisfactory communication quality, and outputs the demodulated informational signal paired with the detected result of the communication quality read out of the selected reception means.

8. The wireless communication system of claim 1, wherein the output-controlling means determines a time difference due to a difference in communication paths relative to the millimetric-wave extremely high frequency wireless signals received by the plural reception means based on the detected result of the synchronization signal by the plural reception means, delays the detected result of the communication quality of any reception means based on the determined time difference, and performs time difference correction processing on any detected result of the communication qualities of the plural reception means to synchronize the detected results of the communication qualities with each other.

9. The wireless communication system of claim 1, wherein the reception means further has delaying means for delaying the demodulated informational signal to be stored in the storing means and a signal used for detecting the synchronization signal in the synchronization-detection-storage-controlling means only by a period of time necessary for detection of the communication quality in the communication quality detection means.

10. The wireless communication system of claim 1, wherein the transmission apparatus transmits a millimetric-wave extremely high frequency wireless signal according to any one of transmission methods using one transmitting means and plural transmitting means with the wireless signals being overlapped.

11. A wireless communication system comprising:
transmission apparatus configured to transmit a millimetric-wave extremely high frequency wireless signal based on a transmission unit in which an informational signal is divided and a synchronization signal is added to the divided informational signal; and
reception apparatus including plural reception devices that receive the millimetric-wave extremely high frequency wireless signal to obtain the informational signals and output-controlling device that selects any informational signal from the informational signals obtained by the plural reception devices,
wherein each of the reception devices includes
communication-quality-detecting device that detects communication quality of the received millimetric-wave extremely high frequency wireless signal;
a demodulator configured to demodulate the received millimetric-wave extremely high frequency wireless signal into a demodulated informational signal;
storing device that stores the demodulated informational signal obtained by the reception device; and
synchronization-detection-storage-controlling device that detects the synchronization signal from the demodulated millimetric-wave extremely high frequency wireless signal, generates a write control signal based on the detected synchronization signal, and controls the storing device to store the demodulated informational signal based on the write control signal, and
wherein the output-controlling device reads the demodulated informational signals out of the storing devices of the plural reception devices with the demodulated informational signals being synchronized with each other after the plural reception devices have detected the synchronization signals, selects from the plural reception devices the reception device having satisfactory communication quality based on a detected result of the communication quality by the plural reception devices, and outputs the demodulated informational signal read out of the selected reception device, wherein the communication quality detection means detects signal strength of the received millimetric-wave extremely high frequency wireless signal as communication quality.

12. A reception apparatus comprising:
plural reception means for receiving a millimetric-wave extremely high frequency wireless signal transmitted on the basis of a transmission unit in which an informational signal is divided and a synchronization signal is added to the divided informational signal to obtain the informational signals; and
output-controlling means for selecting any informational signal from the informational signals obtained when the plural reception means receive the millimetric-wave extremely high frequency wireless signal,
wherein each of the plural reception means includes
communication quality detection means for detecting communication quality of the received millimetric-wave extremely high frequency wireless signal;
demodulation means for demodulating the received millimetric-wave extremely high frequency wireless signal into a demodulated informational signal;
storing means for storing the demodulated informational signal obtained by the reception means; and
synchronization-detection-storage-controlling means for detecting the synchronization signal from the demodulated millimetric-wave extremely high frequency wireless signal, generating a write control signal based on the detected synchronization signal, and controlling the storing means to store the demodulated informational signal based on the write control signal, and
wherein the output-controlling means reads the demodulated informational signals out of the storing means of the plural reception means with the demodulated informational signals being synchronized with each other after the plural reception means have detected the synchronization signals, selects from the plural reception means the reception means having satisfactory communication quality based on a detected result of the communication quality by the plural reception means, and outputs the demodulated informational signal read out of the selected reception means, wherein the communication quality detection means detects signal strength of the received millimetric-wave extremely high frequency wireless signal as communication quality.

13. The reception apparatus of claim 12, wherein the storing means successively stores at least a demodulated informational signal corresponding to a time difference due to a difference in communication paths relative to the millimetric-wave extremely high frequency wireless signals received by the plural reception means.

14. The reception apparatus of claim 12, wherein the storing means further stores a demodulated informational signal corresponding to a period of time necessary for detection of communication quality in the communication quality detection means.

15. The reception apparatus of claim 14, wherein the output-controlling means starts reading the demodulated informational signal at least after a period of time necessary for detection of communication quality is passed since the plural reception means have detected the synchronization signals.

16. The reception apparatus of claim 12, wherein the communication quality detection means detects signal strength of the received millimetric-wave extremely high frequency wireless signal as communication quality.

17. The reception apparatus of claim 12, wherein the communication quality detection means detects frequency of error in the received millimetric-wave extremely high frequency wireless signal as communication quality.

18. The reception apparatus of claim 12, wherein when the reception means to be selected based on the detected result of the communication quality is switched, the output-controlling means stops the reception means selected before the switch from being selected during a period of the transmission unit when the reception means is switched.

19. The reception apparatus of claim 12, wherein the storing means stores a pair of the demodulated informational signal and the detected result of the communication quality when receiving the demodulated informational signal; and
wherein the output-controlling means reads the detected results of the communication qualities out of the storing means of the plural reception means with the results being synchronized with each other, to select from the plural reception means the reception means having satisfactory communication quality, and outputs the demodulated informational signal paired with the detected result of the communication quality read out of the selected reception means.

20. The reception apparatus of claim 12, wherein the output-controlling means determines a time difference due to a difference in communication paths relative to the millimetric-wave extremely high frequency wireless signals received by the plural reception means based on the detected result of the synchronization signal by the plural reception means, delays the detected result of the communication quality of any reception means based on the determined time difference, and performs time difference correction processing on the detected results of the communication qualities of the plural reception means to synchronize the detected results of the communication qualities with each other.

21. The reception apparatus of claim 12, wherein the reception means further has delaying means for delaying the demodulated informational signal to be stored in the storing means and a signal used for detecting the synchronization signal in the synchronization-detection-storage-controlling means only by a period of time necessary for detection of the communication quality in the communication quality detection means.

22. A reception apparatus comprising:
plural reception devices configured to receive a millimetric-wave extremely high frequency wireless signal transmitted on the basis of a transmission unit in which an informational signal is divided and a synchronization signal is added to the divided informational signal to obtain the informational signals; and
output-controlling device configured to select any informational signal from the informational signals obtained when the plural reception devices receive the millimetric-wave extremely high frequency wireless signal,
wherein each of the plural reception devices includes
communication-quality-detecting device that detects communication quality of the received millimetric-wave extremely high frequency wireless signal;
a demodulator configured to demodulate the received millimetric-wave extremely high frequency wireless signal into a demodulated informational signal;
storing device that stores the demodulated informational signal obtained by the reception device; and
synchronization-detection-storage-controlling device that detects the synchronization signal from the demodulated millimetric-wave extremely high frequency wireless signal, generates a write control signal based on the detected synchronization signal, and controls the storing device to store the demodulated informational signal based on the write control signal, and
wherein the output-controlling device reads the demodulated informational signals out of the storing devices of the plural reception devices with the demodulated informational signals being synchronized with each other after the plural reception devices have detected the synchronization signals, selects from the plural reception devices the reception device having satisfactory communication quality based on a detected result of the communication quality by the plural reception devices, and outputs the demodulated informational signal read out of the selected reception device, wherein the communication quality detection means detects signal strength of the received millimetric-wave extremely high frequency wireless signal as communication quality.

* * * * *